United States Patent
Hierzer (10) Patent No.: US 10,180,218 B2
(45) Date of Patent: Jan. 15, 2019

(54) LIGHTING ARRANGEMENT AND METHOD FOR CONSTRUCTING A LIGHTING ARRANGEMENT

(71) Applicant: H4X e.U., Graz (AT)

(72) Inventor: Andreas Hierzer, Graz (AT)

(73) Assignee: H4X e.U., Graz (AT)

(*) Notice: Subject to any disclaimer, the term of this patent is extended or adjusted under 35 U.S.C. 154(b) by 0 days.

(21) Appl. No.: 15/389,649

(22) Filed: Dec. 23, 2016

(65) Prior Publication Data

US 2017/0184263 A1    Jun. 29, 2017

(30) Foreign Application Priority Data

Dec. 23, 2015    (DE) .......................... 10 2015 226 625

(51) Int. Cl.
*F21S 8/02* (2006.01)
*F21V 14/02* (2006.01)
(Continued)

(52) U.S. Cl.
CPC .............. *F21S 8/026* (2013.01); *F21V 14/02* (2013.01); *F21V 15/01* (2013.01); *F21V 17/02* (2013.01);
(Continued)

(58) Field of Classification Search
CPC .......... F21S 8/026; F21V 14/02; F21V 15/01; F21V 17/02; F21V 17/105; F21V 21/04;
(Continued)

(56) References Cited

U.S. PATENT DOCUMENTS 2,279,383 A    4/1942    Von Gehr
3,917,940 A    11/1975    Duddy
(Continued)

FOREIGN PATENT DOCUMENTS

CN    104 428 580 A    3/2015
DE    84 09 006 U1    6/1984
(Continued)

OTHER PUBLICATIONS

German Office Action dated Aug. 18, 2016, issued in corresponding DE 102015226625.7, 10 pages.
(Continued)

*Primary Examiner* — Laura Tso
(74) *Attorney, Agent, or Firm* — Millen, White, Zelano & Branigan, P.C.; William Nixon (57) ABSTRACT

A lighting arrangement has a housing having an interior and a light outlet region, and at least one light-providing device. The light-providing device is configured such that it can be arranged within the interior to emit light during operation through the light outlet region to the outside. The light-providing device can be coupled to the housing and can be freely positioned at least within one region of the interior. A second lighting arrangement has a housing having an interior and a light outlet region, the housing having an opening, which is set up to guide at least one line through the opening out of the interior. The second lighting arrangement has at least one brush, which is provided with hairs or fibers or bristles, which are arranged in the opening and/or cover the opening at least in portions.

22 Claims, 9 Drawing Sheets

(51) Int. Cl.
*F21V 15/01* (2006.01)
*F21V 21/096* (2006.01)
*F21V 17/02* (2006.01)
*F21V 17/10* (2006.01)
*F21V 21/04* (2006.01)
*F21V 21/14* (2006.01)
*H02G 3/20* (2006.01)
*F21V 23/00* (2015.01)

(52) U.S. Cl.
CPC ............ *F21V 17/105* (2013.01); *F21V 21/04* (2013.01); *F21V 21/096* (2013.01); *F21V 21/14* (2013.01); *H02G 3/20* (2013.01); *F21V 23/002* (2013.01)

(58) Field of Classification Search
CPC ...... F21V 21/096; F21V 21/14; F21V 23/002; H02G 3/20
USPC .................. 362/389, 249.07; 174/59, 60
See application file for complete search history.

(56) References Cited

U.S. PATENT DOCUMENTS

| | | | | |
|---|---|---|---|---|
| 4,551,577 | A * | 11/1985 | Byrne | A47B 21/06 174/500 |
| 5,954,525 | A * | 9/1999 | Siegal | A47B 21/06 312/223.6 |
| 8,227,813 | B2 | 7/2012 | Ward | |
| 8,979,305 | B2 | 3/2015 | Sachsenweger | |
| 9,765,954 | B2 | 9/2017 | Zaderej et al. | |
| 2006/0138293 | A1 | 6/2006 | Clement | |
| 2009/0086478 | A1 | 4/2009 | Sanroma et al. | |
| 2010/0165646 | A1 | 7/2010 | Russo | |
| 2012/0068621 | A1 | 3/2012 | Ward | |
| 2012/0075857 | A1* | 3/2012 | Verbrugh | F21S 8/038 362/249.01 |
| 2012/0182725 | A1* | 7/2012 | King | F21S 9/037 362/183 |
| 2014/0182929 | A1* | 7/2014 | Zeng | H02G 3/32 174/650 |
| 2014/0332264 | A1* | 11/2014 | Chen | H01B 7/06 174/70 R |
| 2015/0300612 | A1 | 10/2015 | Stathes | |
| 2016/0195250 | A1* | 7/2016 | Park | F21S 8/038 362/219 |

FOREIGN PATENT DOCUMENTS

| | | |
|---|---|---|
| DE | 29509696 U1 | 8/1995 |
| DE | 295 15 221 U1 | 1/1996 |
| DE | 200 17 551 U1 | 2/2001 |
| DE | 10 2010 040892 A1 | 3/2012 |
| DE | 20 2012 008828 U1 | 12/2012 |
| DE | 20 2014 104 473 U1 | 1/2016 |
| EP | 2 657 590 A1 | 10/2013 |
| WO | 2014/081842 A1 | 5/2014 |
| WO | 2015/096036 A1 | 7/2015 |

OTHER PUBLICATIONS

Mag Daddy Magnetic Fasteners: Information Technology Solutions Magnetic Zip Tie Holder RES-62416-W / RES-62416-B, Aug. 3, 2011 (Aug. 3, 2011), XP055350951, created on Mar. 8, 2011 modified on Apr. 23, 2012 Gefunden im Internet: URL:http://www.cableorganizer.com/images/magnetic-cable-clips/cable-holder-specifications.pdf [gefunden am Mar. 2, 2017].
European Search Report Corresponding to EP 17 19 5983—dated Jan. 12, 2018.
European Search Report Corresponding to EP 16 20 5038—dated Mar. 2, 2017.
German Search Report Corresponding to DE 10 2015 226 625.7—dated Jan. 10, 2017.
German Search Report Corresponding to DE 10 2016 219 697.9—dated Jul. 10, 2017.
Austrian Search Report Corresponding to AT 50021—dated May 9, 2018.

* cited by examiner

LIGHTING ARRANGEMENT AND METHOD FOR CONSTRUCTING A LIGHTING ARRANGEMENT

FIELD OF THE INVENTION

The invention relates to lighting arrangements and to a method for constructing a lighting arrangement.

TECHNICAL BACKGROUND

Both in private living spaces and in offices, exhibition spaces, salesrooms and many other premises, an attempt is frequently made to light in a targeted manner a specific region of the room or a plurality of specific regions of the room, articles located in the room, objects hanging on a wall of the room or architectural features of the room. Spotlights fastened, for example, to a ceiling of the room are often used in a conventional manner for this purpose and are oriented to the desired region of the room or the desired object. Depending on the direction of observation, an observer located in the room may, however, be blinded by conventional spotlights of this type or may at least find the directly visible light source unattractive or disturbing.

An improved lighting arrangement is to be proposed, which at least substantially avoids drawbacks of this type.

SUMMARY OF THE INVENTION

Against this background, an idea of the invention is to disclose a lighting arrangement, which has favourable glare-free properties and provides the user with a high degree of flexibility in the aimed-for lighting of objects and/or regions of the room. In addition, an improved method is to be disclosed for constructing a lighting arrangement.

Accordingly, an exemplary lighting arrangement is proposed, which comprises a housing having an interior and a light outlet region. The lighting arrangement furthermore can comprise at least one light-providing device, the light-providing device being configured such that it can be arranged within the interior to emit light during operation through the light outlet region to the outside. According to an embodiment of the invention, it is proposed that the light-providing device can be coupled to the housing and can be freely positioned at least within one region of the interior.

Furthermore, a method for constructing a lighting arrangement of this type is proposed, the method having the steps:

providing a housing having an interior and a light outlet region, and providing at least one light-providing device;

introducing the light-providing device into the interior and coupling the light-providing device to the housing to hold the light-providing device within the interior; and positioning the light-providing device in such a way that the light-providing device, as required after additionally orienting it, can emit light through the light outlet region to the outside during operation.

Moreover, a lighting arrangement is proposed, which comprises a housing having an interior and a light outlet region, the housing being provided with an opening. The opening is set up to guide at least one line through the opening out of the interior. The lighting arrangement furthermore has at least one brush, which is provided with hairs or fibres or bristles, the hairs, fibres or bristles being arranged in the opening and/or covering the opening at least in portions.

One idea of the present invention consists in combining arranging the light-providing device within the interior of the housing and shining or beaming out by emitting light through the light outlet region to the outside with a free positionability of the light-providing device within the interior, or at least within a region of the interior. The free positionability of the light-providing device makes it possible to allow the light-providing device to shine out through the light outlet region in the desired manner, for example for aesthetic reasons. This may also be advantageous if, within premises, the arrangement of the objects to be lit changes after some time, for example. Thus, a highly flexible lighting possibility is provided, which, additionally, owing to the arrangement of the light-providing device in the interior and the shining out through the light outlet region, has advantageous glare-free properties.

A further idea of the invention is that when a housing having an interior and a light outlet region is provided with an opening and the opening is covered by means of hairs, fibres or bristles of a brush, a line, for example an electrical line, can be advantageously guided out of the interior in such a way that the user is not limited with respect to his flexibility when arranging and orienting a light-providing device and nevertheless the opening is closed at least substantially in a light-proof manner by the hairs, fibres or bristles of the brush even with a line guided through it. Thus, a highly flexible lighting solution can also be provided, in which an undesired emission of light out of the interior through an opening provided to guide a line through can furthermore be avoided.

Advantageous embodiments and developments emerge from the dependent claims and from the description with reference to the drawings.

In one embodiment, it is provided that to fasten the light-providing device on the housing at various locations within the interior, the light-providing device can be coupled to a component of the housing by means of magnetic force.

In particular, in one embodiment, the light-providing device can be fastened to adhere magnetically to at least one inner surface region of the housing for coupling to the housing. A particularly simple, effective and flexible fastening of the light-providing device within the interior thus succeeds in such a way that the light-providing device can be freely positioned.

In one embodiment, the light-providing device has at least one magnet, in particular a permanent magnet, by means of which it is possible to couple the light-providing device to the housing.

In another embodiment, the housing is configured as an installation housing and is set up in such a way that the housing can be inserted in a recess provided for this in a ceiling and can be fastened in the recess. A housing of this type can be concealed behind a suspended ceiling to be substantially invisible from the outside, it only being possible to see the light outlet region from the outside, in other words from the side of the ceiling facing the room. A discreet and aesthetic lighting solution thus becomes possible, the flexibility being completely retained for the user, however, with regard to the articles or regions of rooms to be lit even when the installation housing is permanently installed in the ceiling and sealed, for example, on the visible side.

In one embodiment, the housing has a housing part with top and wall portions and with an open end. In this embodiment, the housing furthermore has an element coupled to the housing part in the region of the open end of the housing part. The element is provided with the light outlet region, and the light outlet region is smaller than the open end of the housing part. The light-providing device or a plurality of light-providing devices can thus be particularly discretely "hidden" between the element and the housing part in the interior, a targeted, directed emission of light through the light outlet region nevertheless being retained.

In a development, the light-providing device can be coupled to the housing part by means of magnetic force. The housing part is preferably configured here with a material which allows a coupling of this type, while the element can advantageously be manufactured from other materials.

In one embodiment, the element may in particular have an opaque body, which is provided with a cutout forming or containing the light outlet region.

In one embodiment, the housing part may be configured in a box-like manner, for example as a cuboidal box with an open side.

In one embodiment, the wall and/or top portions of the housing part and in particular the inner surface regions of the housing part in the region of the wall and/or top portions thereof are substantially flat. An embodiment of this type facilitates the holding of the at least one light-providing device by means of magnetic force.

In particular, in one embodiment, the housing part may be configured as a sheet metal part, for example made of steel sheet.

In a further development, the element may be configured as a plaster part, or at least the opaque body of the element may be configured as a plaster part.

In one development, the lighting arrangement has a plurality of light-providing devices, each of the light-providing devices being able to be freely positioned at least within one region of the interior. In particular, the lighting arrangement may, for example, have two, three or four light-providing devices. A plurality of objects at various positions can, for example, be simultaneously lit in this manner by means of the lighting arrangement. The plurality of light-providing devices are preferably arranged for this purpose within the interior in such a way that they can in each case emit light through the light outlet region to the outside during operation. The lighting of a plurality of articles or regions of the room therefore succeeds in a flexible and also discreet manner. However, it is also conceivable for precisely one light-providing device in the lighting arrangement to be arranged within the interior.

The plurality of light-providing devices may in particular be coupled to the housing in the same manner. In a further embodiment, the plurality of light-providing devices may in particular be in each case configured in the same manner.

According to one embodiment, the light-providing device has a soft component, which comes into contact with the housing when the light-providing device is coupled to the housing. In particular, the soft component may be configured as a felt element. The soft component contributes to noise reduction when coupling the light-providing device to the housing and may also contribute to protecting the inner surfaces of the housing from superficial damage, for example by scratching. In addition, it is also possible to position and vary the positioning without damage and with low noise.

In addition to the free positionability of the light-providing device, in one development, the light-providing device can furthermore be oriented and/or adjusted. In particular, this orientability and/or adjustability may be provided to change a beam direction of the light-providing device as required. The flexibility with a view to the lighting of a wide variety of objects or achieving desired aesthetic lighting effects can thus be still further improved. The light-providing device may, for example, have a pivotable functional portion for this purpose.

In one embodiment, the light-providing device contains a light source having a medium-narrow or preferably narrow beam angle. For example, the beam angle of the light source may be up to and including about 20 degrees, wherein the beam angle may, for example, be between about 6 degrees and about 20 degrees. In one variant, it would be conceivable for the light source to have a beam angle of a maximum of 15 degrees. The use in particular of narrow-beam light sources allows a targeted emission of light through the light outlet region to the outside in order to illuminate a region of the room or an object there in a targeted manner. An undesired illumination of the housing interior by the light source of the light-providing device is avoided.

In an advantageous embodiment, the lighting arrangement furthermore has at least one additional light source, which is arranged and configured to emit light into the interior and in particular to thereby backlight the housing. In this manner, a particularly interesting aesthetic effect can be achieved, in that the light outlet region does not only allow the illumination of objects for example located in the room through the light outlet region, but the interior itself also creates the impression of glowing. The impression of a glowing light outlet hole can be achieved with a light outlet region configured as a hole in the element.

In particular, in one embodiment, the additional light source may be arranged facing the interior in a recessed area of the element, as a result of which a body portion of the element is located between the light outlet region and the additional light source. Thus, the additional light source cannot be seen from the visible side or outside, which further improves the aesthetic effect of the backlighting or glowing.

In one embodiment, the additional light source may be formed with at least one LED or an LED arrangement.

According to a development, the housing is equipped with an opening, which is set up to guide at least one line serving to supply the light-providing device out of the interior. In this embodiment, the lighting arrangement has a brush, the hairs or fibres or bristles of which are arranged in the opening and/or cover the opening at least in portions. With this embodiment, it is possible to guide the line serving to supply the light-providing device, for example an electrical cable, out of the interior without impairing the flexibility of the positioning of the light-providing device within the interior. Line portions not required can thus easily be pushed through the opening out of the housing or an additionally required length can easily be pulled through. In addition, an emission of light through the opening is avoided with the aid of the hairs, fibres or bristles. The hairs, fibres or bristles of the brush are preferably arranged in such a way that, optionally in interaction with a base body of the brush, the opening is completely covered.

According to one embodiment of the invention, the lighting arrangement has a line provided to supply the light-providing device, this line being configured in such a way that it can be magnetically coupled to a component of the housing and can thereby be held and/or guided within the interior. This embodiment can also in turn contribute to the flexible, free positionability of the light-providing device as, owing to the magnetic coupling of the line to the housing and the guiding of the line thus achieved, said line, depending on the positioning of the light-providing device, can be arranged and held precisely where it is least disturbing. In particular, the line hanging in the light cone or light beam provided by the light-providing device is avoided. The arrangement of a plurality of light-providing devices inside the interior and their positioning is also thus considerably facilitated.

The supply line for the light-providing device may in particular be a cable for supplying the light-providing device with electrical current. In the case of a plurality of light-providing devices, each of these may have its own supply line of this type.

In one embodiment, for magnetic coupling to the component of the housing, the line may be provided with a sheath, which contains one or more magnetic components, or the line may be provided along the longitudinal extent with one or more magnetic holding elements.

In one embodiment of the method, the light-providing device is coupled to a component of the housing by means of magnetic force. The advantages of the coupling by means of magnetic force have already been mentioned above.

In one embodiment, the method furthermore comprises adjusting the light-providing device by sliding displacement and/or rotation of the light-providing device on the housing. The adjustment can thus take place in a particularly simple and flexible manner.

In a development of the method, the introduction of the light-providing device into the interior, the coupling thereof to the housing and the positioning of the light-providing device takes place through a cutout forming or containing the light outlet region, in particular once the housing has been mounted in the region of a ceiling. This is advantageous as, when installing the housing, it does not yet have to be established how many light-providing devices are to be received in the interior and how they are to be oriented. A highly flexible construction of the lighting arrangement thus becomes possible.

In one embodiment, the method furthermore comprises arranging a line provided to supply the light-providing device within the interior and magnetically coupling the line to a component of the housing to hold the line within the housing. The advantages of a magnetic coupling of this type have also already been mentioned above.

The above embodiments and developments may be combined with one another in any desired manner within reason Further possible embodiments, developments and implementations of the invention also include combinations not explicitly mentioned of features of the invention described above or in the following in relation to the embodiments. In particular, a person skilled in the art will also add individual aspects to each basic form of the present invention as improvements or additions.

BRIEF DESCRIPTION OF DRAWINGS

The invention will be described in more detail below by way of the embodiments set out in the drawings, in which.

The accompanying drawings are intended to provide a further understanding of the embodiments of the invention. They illustrate embodiments and are intended to explain principles and concepts of the invention in connection with the description. Other embodiments and many of the advantages mentioned can be seen from the drawings. The elements of the drawings are not necessarily to scale.

In the drawings, unless specified otherwise, like, functionally equivalent and equivalently acting elements, features and components are provided with like reference numerals.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102015226625.7 filed Dec. 23, 2015 is incorporated by reference herein.

DESCRIPTION OF EMBODIMENTS

Figure 1:
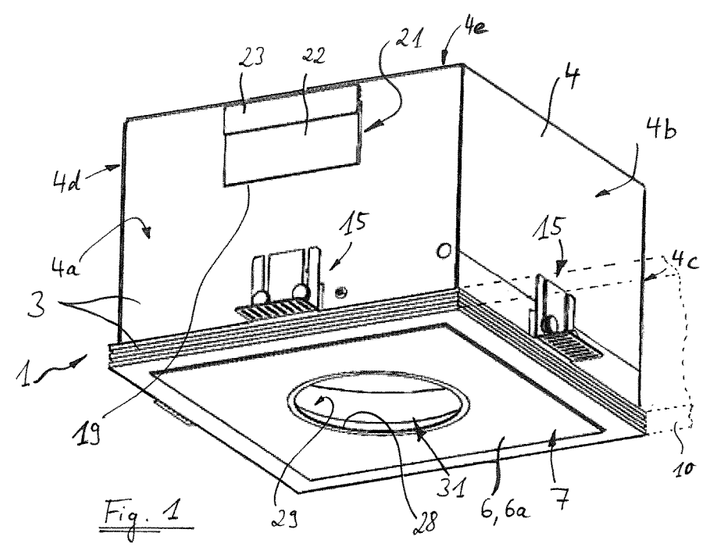
FIG. 1 is a perspective view of a lighting arrangement according to a first embodiment of the invention from a side of a housing provided with a light outlet region.

FIG. 1 shows a lighting arrangement 1 according to a first embodiment of the invention. The lighting arrangement 1 has a housing 3, which is formed with a box-like housing part 4 and a plate-like element 6. The housing part 4 is cuboidal and has wall portions 4a to 4d and a top portion 4e, so the housing part 4 is substantially closed on five sides. In the region of the sixth side, in FIG. 1 the base side of the housing part 4, the housing part 4 is open, in other words has an open end 4f. The sixth side of the housing part 4 is closed by the element 6 coupled to the housing part 4 and arranged in the region of the open end 4f. The element 6 and the housing part 4 can be fastened to one another in a suitable manner for this purpose.

The housing part 4 is configured as a sheet metal part and, for example, is manufactured from steel sheet. On the other hand, the element 6 is configured with an opaque body 6a, the body 6a being configured as a plaster part. The element 6 may, for example, be white on its outside 7.

The housing 3 is configured as an installation housing and is provided to be inserted in a suitably dimensioned recess 10a (see FIG. 3) in a suspended ceiling 10, in particular a plaster ceiling, and fastened in the recess 10a. To hold the housing 3 on the ceiling 10, the lighting arrangement 1 has holding means 15 on the housing 3, which are configured in an angular manner in the first embodiment shown in FIGS. 1 to 3. However, it is obvious that to fasten the housing 3 in the ceiling 10, other fastening means familiar to a person skilled in the art could be used. After the installation of the housing 3 in the ceiling 10, filling can possibly take place, for example during drywall works.

Figure 2:
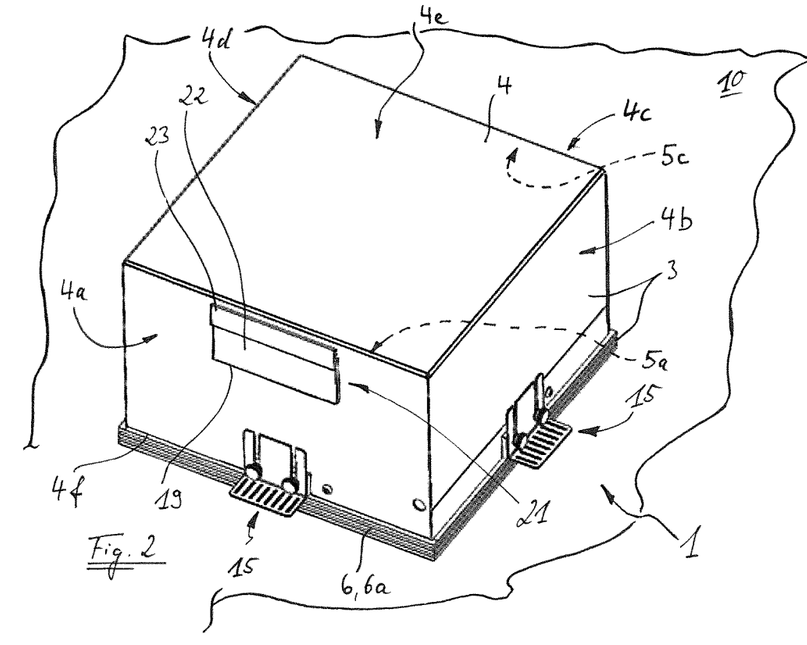
FIG. 2 is a perspective view of the lighting arrangement of FIG. 1 from a side of the housing opposing the light outlet region.
Figure 3:
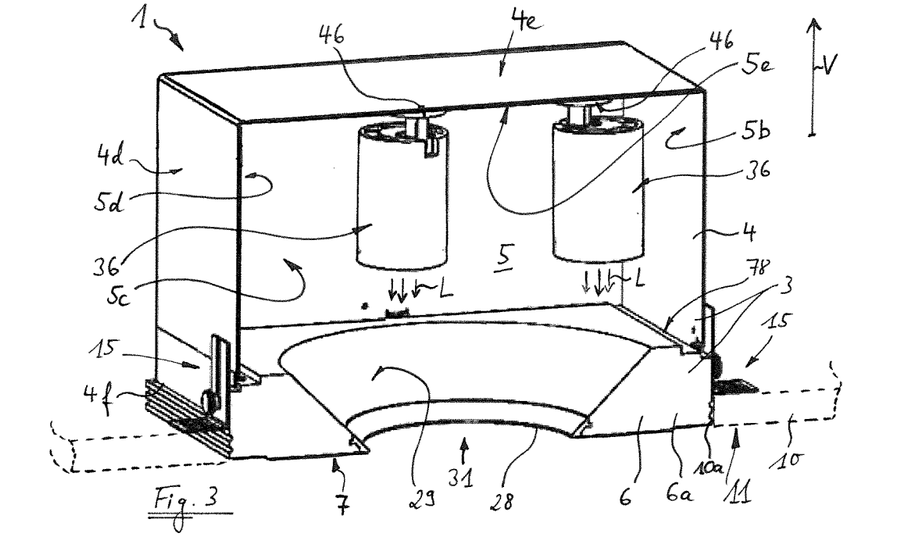
FIG. 3 is a perspective sectional view through a lighting arrangement according to the first embodiment, which has two light-providing devices configured in the same way.

The plate-like element 6, in the embodiment of FIGS. 1 to 3, has a rectangular shape, wherein however both the recess 10a provided in the ceiling 10 and the element 6 could have another suitable shape, for example another angular shape or a round, for example circular or oval, shape. It can furthermore be seen in FIGS. 1 and 2 that the wall portion 4a is provided with a rectangular opening 19. The opening 19 is closed by a cable brush 21 having an edging 22, the cable brush 21, for example, being fastened to an edge of the opening 19 and overlapping this edge, for example, to clamp the brush 21. For this purpose, the cable brush 21 may, for example, have a suitable groove on its base body 23. The edging 22 is formed by hairs, fibres or bristles 25 (see FIG. 11, 12), the hairs, fibres or bristles 25 of the edging 22 being arranged in the opening 19 in FIGS. 1 and 2 and therefore completely covering the opening 19 together with the base body 23. The cable brush 21 allows a light-proof closure of the opening 19, but at the same time makes it possible to guide supply lines in the form of one or more electrical cables through the opening 19 out of the housing 3 to the outside.

FIG. 1 also shows that the element 6, in the first embodiment, is provided with a circular cutout 28 in the body 6a, which forms a hole in the body 6a. The cutout 28 serves as a light outlet region 31.

The lighting arrangement 1 according to the first embodiment furthermore has two light-providing devices 36, which are visible in FIG. 3. The light-providing devices 36 are in each case dimensioned and configured in a suitable manner to be arranged within an interior 5 of the housing 3. In the view of FIG. 3, the two light-providing devices 36 are arranged in the interior 5. The two light-providing devices 36 are in each case located here completely within the interior 5. In the first embodiment, the light-providing devices 36 are configured as narrow-beam spotlights or "spots". The light-providing devices 36 are to be described in more detail below with reference to FIGS. 5 to 8.

The light-providing devices 36 are in each case provided to emit light L through the light outlet region 31 to the outside during operation, in other words to shine through the light outlet region 31 out of the interior 5 in a targeted manner. This succeeds in illuminating an object located outside the interior 5 within the premises having the suspended ceiling 10, or a region of the room, through the light outlet region 31 in a targeted manner, and at the same time achieving a particularly favourable anti-glare behaviour. The light-providing devices 36 are hardly perceivable by an observer located in the lit premises but nevertheless allow targeted illumination of selected regions of the room, architectural features or articles located in the premises. This succeeds in that the light-providing devices 36, viewed from outside the interior 5, are arranged behind the element 6 in the interior 5 and are therefore "hidden", i.e. the light-providing devices 36 are set back behind the ceiling 10 in relation to a plane 11 forming an outside of the ceiling 10.

A light-providing device 36, as used in the embodiment of FIGS. 1 to 3, is shown in more detail in FIGS. 5 to 8. The light-providing device 36 has a functional portion 45 and a base portion 46, the base portion 46 being connected by a rod 47 to the functional portion 45. The functional portion 45 can be pivoted in relation to the base portion 46 by a pivot axis 48, for example through 90 degrees.

The light-providing device 36 is configured as a spotlight or "spot" and has a light source with a narrow beam angle $\alpha$. In the first embodiment, the beam angle $\alpha$ is a maximum of 20 degrees. The beam angle $\alpha$ may, for example, be between 6 degrees and 20 degrees. Since the light-providing device 36 has a narrow-beam light source, despite the offset of the light-providing device 36 behind the plane 11 into the interior 5, an object outside the interior 5 can be lit through the light outlet region 31 in a targeted manner, without excessive losses occurring due to the illumination of the interior 5.

Each of the light-providing devices 36 can be coupled to the housing 3 by means of the base portion 46. For this purpose, the base portion 46 has a permanent magnet 55, which is configured as a ring magnet in the embodiment shown. As described above, the housing part 4 is configured as a sheet metal part, a metal sheet, on which a permanent magnet can exert an attraction, being selected for the housing part 4 in the first embodiment. For example, the housing part 4 is formed from a steel sheet. In the box-like, cuboidal configuration of the housing part 4 with flat wall portions 4a to e, wall regions 5a, 5b, 5c and 5d and an inner top region 5e of the inner surface of the housing part 4 are flat. In another variant, the inner surface regions 5a to e are coloured black.

By means of the permanent magnet 55 arranged in the base portion 46, each of the light-providing devices 36 can be coupled to the housing part 4 of the housing 3 by a magnetic force. For this purpose, the respective light-providing device 36 is fastened with its base portion 46 to mechanically adhere on one of the inner surface regions 5a to 5e. The magnet 55 can therefore hold the light-providing device 36 to magnetically adhere both to one of the walls of the housing part 4 in the wall regions 5a to 5d and to the top of the housing part 4 in the top region 5e. This is facilitated by the flat form of the wall and top regions 5a to d, 5e, which allow easy abutment of the base portion 46. Each of the light-providing devices 36 can thus be freely positioned within the interior 5 such that the respective base portion 46 can be coupled to magnetically adhere at any desired free point of the inner surface regions 5a to d, 5e, as required (see FIG. 3). It is obvious that collisions of two light-providing devices 36 can be avoided by suitable arrangement thereof in the interior 5.

The light-providing devices 36, of which in the first embodiment, see FIG. 3, two pieces are present and the two are coupled by way of example in the top region 5e to the housing part 4, can thus be freely positioned on the housing 3 within the interior 5, or at least one region thereof. In addition, the light-providing devices 36, because of the fastening by means of the magnetic coupling to the housing part 4, can be displaced by sliding and rotated on the housing part 4 without the position of a light-providing device 36 within the interior 5 being limited to one or more discrete positions. Rather, the positions of the light-providing devices 36 are continuously variable. Thus, a wide variety of different arrangements of a plurality of light-providing devices 36 becomes possible.

The element 6 closes the open end 4f of the housing 4 except for the cutout 28. The cutout 28 forms a light outlet region 31, which is smaller than the open end 4f of the housing part 4. The element 6 furthermore has a widening region 29 in the body 6a. The region 29 widens proceeding from the cutout 28, and therefore proceeding from the outside 7 of the element 6, inwardly, in other words towards the interior 5. In the first embodiment, the cutout 28 is circular and the region 29 widens inwardly in the manner of a circular truncated cone. The light-providing devices 36 can thus, even with a greater thickness of the body 6a, see FIG. 3, be positioned laterally offset in relation to the cutout 28 behind sub-regions of the element 6, approximately close to one of the wall portions 4a to 4d.

By pivoting the functional portion 45 about the pivot axis 48, the light-providing devices 36 may, for example, shine out of the light outlet region 31 in an inclined manner with respect to a vertical direction V. By means of an adjustment of this type of the functional portion 45, in addition to the free positionability of the light-providing device 36, the beam direction A of the light-providing device 36 may therefore be flexibly changed as required.

Figure 4:
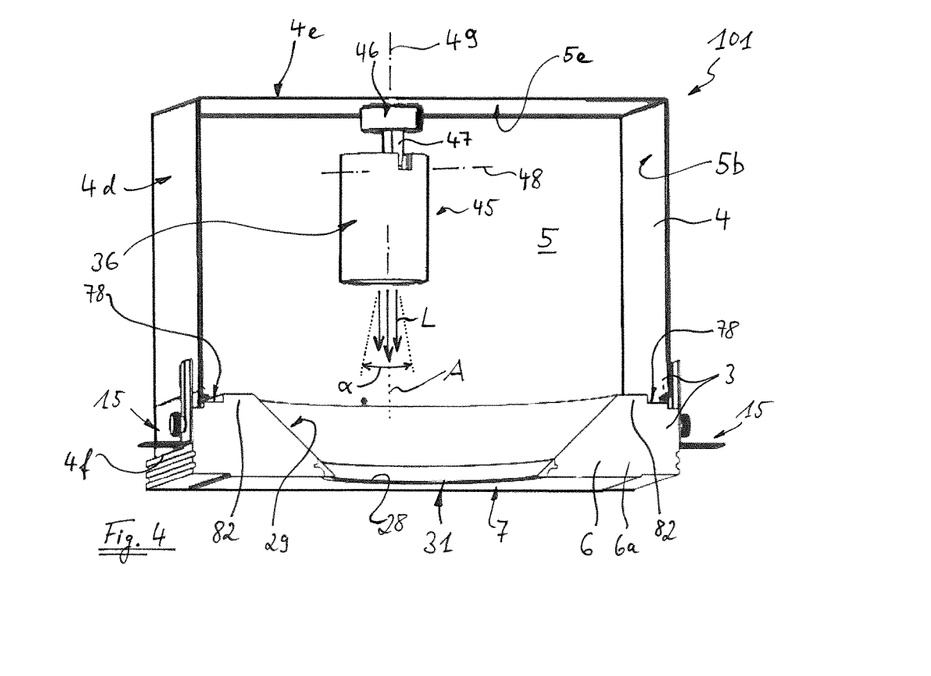
FIG. 4 is a perspective sectional view through a lighting arrangement according to a second embodiment of the invention, only one light-providing device being provided.

FIG. 4 shows a second embodiment. The lighting arrangement 101 according to the second embodiment differs from the first embodiment merely in that only one light-providing device 36 is arranged within the interior 5. As also in FIG. 3, both the functional portion 45 and the base portion 46 and the rod 47 are located completely within the interior 5. The single light-providing device 36 of FIG. 4, like each of the light-providing devices 36 of FIG. 3, can be positioned as a whole within the interior 5, can be fastened magnetically to a selected location within the interior 5, and the light-providing device 36 can also be oriented within the interior 5, for example by pivoting the functional portion 45. A further orientation can take place by rotation about a vertical axis 49 normal to the surface in FIG. 4 by sliding the base portion 46 on the top portion 5e of the inner surface. An electrical line, for example a cable, serving to supply the light-providing device 36 is to be located in portions inside and in portions outside the interior 5, but is not shown in FIG. 4. The light-providing device 36 of FIG. 4 can also be positioned freely and as desired within the interior 5, can be rotated about the axis 49 and is pivotable about the axis 28, so that light L can be beamed to the outside, directed through the cutout 28. The surface of the widening region 29 is preferably coloured black in FIG. 4, and also in FIG. 3.

The base portion 46, see FIGS. 5 to 8, is of substantially cylindrical outer basic form, the base portion 46, on a flat end face pointing away from the functional portion 45, having a soft component 64, which, in the embodiment of FIGS. 5 to 8, is preferably configured as a circular felt washer. When coupling the light-providing device 36 to the housing 3 by means of the permanent magnet 55, the soft component 64 comes into contact with the top region 5e or one of the wall regions 5a to d of the inner surface of the housing part 4. Noises when inserting the light-providing device 36 into the interior 5 and when coupling it to the housing 3, and noises and damage to the inner surface regions 5a to e of the housing part 4 when displacing or rotating the base portion 46 in the state magnetically coupled to the housing part 4 may be avoided by the soft component 64.

Figure 5:
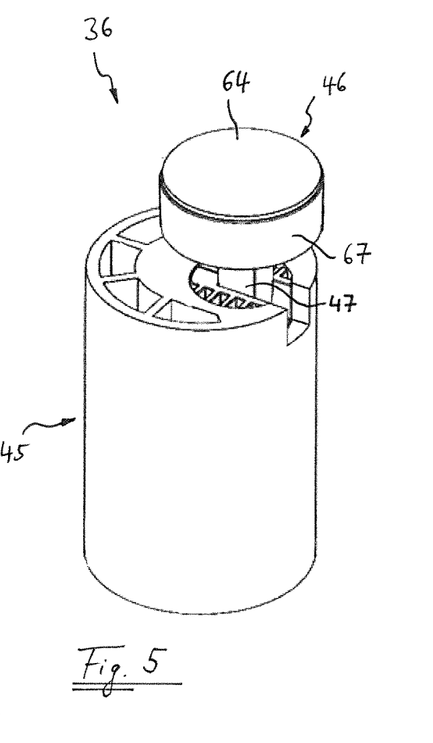
FIG. 5 is a perspective view of a light-providing device.
Figure 6:
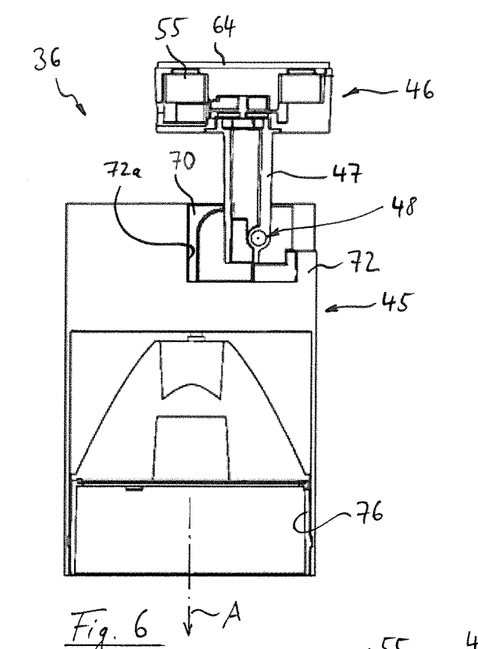
FIG. 6 is a central section through the light-providing device of FIG. 5.
Figure 7:
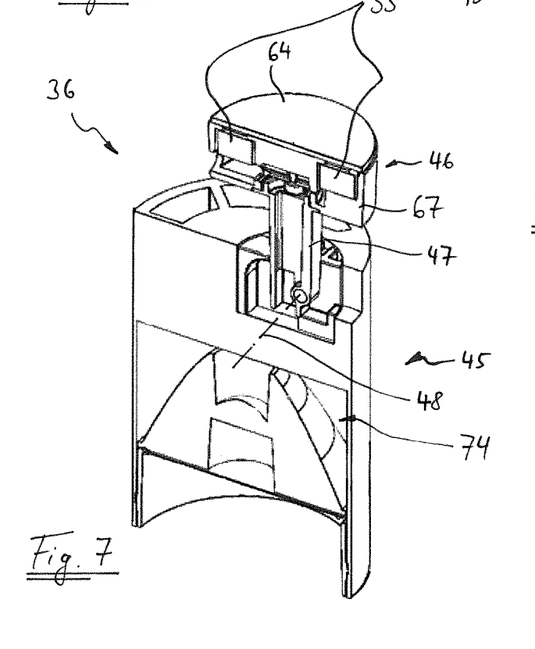
FIG. 7 is a perspective sectional view of the light-providing device of FIG. 5.
Figure 8:
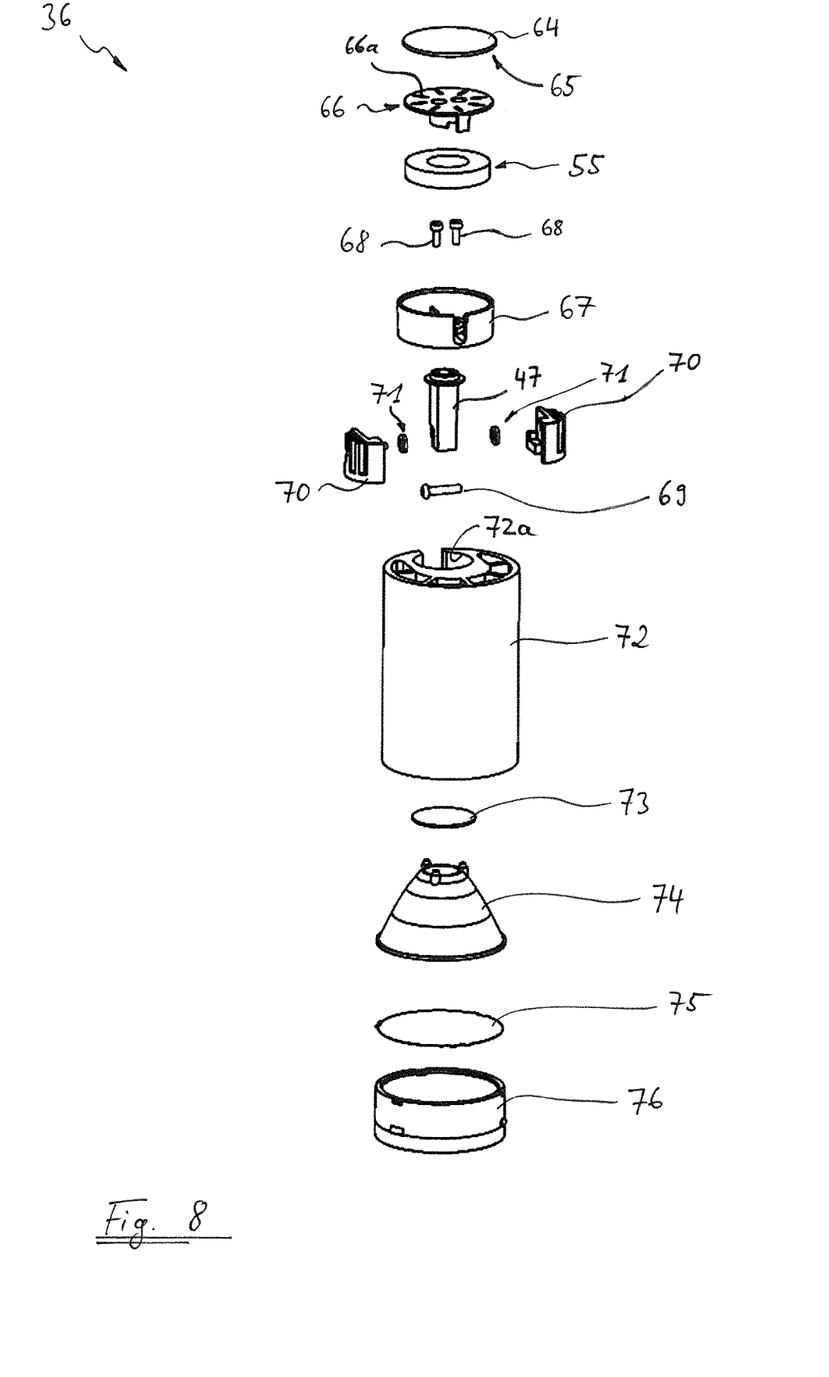
FIG. 8 is an exploded view of the light-providing device of FIG. 5.
Figure 9:
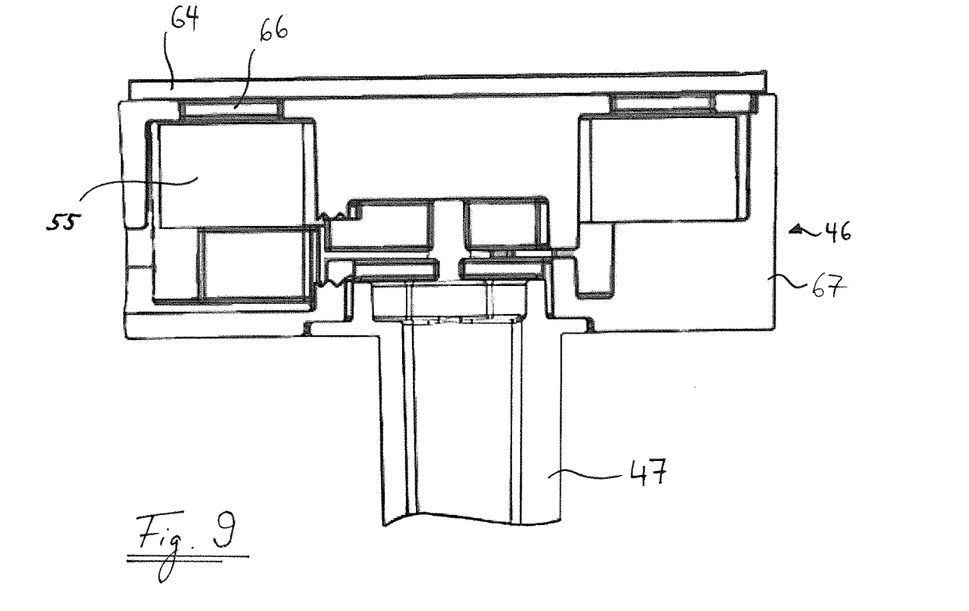
FIG. 9 is an enlarged view of a base portion of the light-providing device of FIG. 5.

The view of FIG. 8 shows individual parts of a light-providing device 36 of FIGS. 5 to 7. The base portion 46 is formed with a round base housing component 67, which receives the permanent magnet 55 configured as a ring magnet. The ring magnet 55 is clamped in the base housing component 67 in FIG. 8 from above by means of a part 66 which is washer-like in portions and is provided with breaks or holes 66a, the part 66, the magnet 55, the base housing component 67 and the rod 47 being held together by means of screws 68. The part 66 can also be snapped in on the base housing component 67. The soft felt element 64, which allows easy, damage-free and low-noise sliding, is glued on its lower side 65 to the washer-like portion of the broken-through part 66. The part 66 may, for example, be manufactured from plastics material and the base housing component 67, the rod 47 and the shell parts 70, for example, from metal, for example aluminium. The breaks or holes 66a improve the magnetic holding effect achieved by the magnet 55.

The functional portion 45 is formed with a cooling body 72, an LED module 73 for producing light, an optical system 74 for example with a lens and/or a reflector, a foil 75 for the purpose of optical improvement, and furthermore an anti-glare ring 76. To connect the functional portion 45 by means of the rod 47 to the base portion 46, the shell parts 70 are held in a friction-locking manner in a recess 72a of the cooling body 72, the shell parts 70 being connected to the rod 47 by means of a screw 69 and washers 71. The pivot axis 48 is also realized by means of the screw 69. With the aid of the optical system 74, the already mentioned narrow beam angle $\alpha$ of the light-providing device 36 is made possible.

Figure 10:
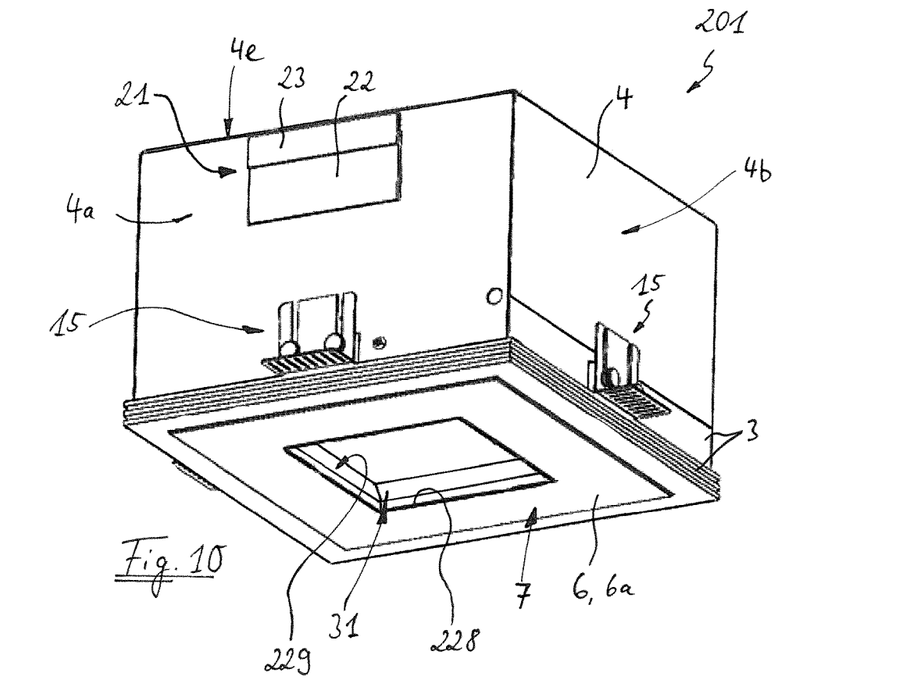
FIG. 10 is a perspective view of a lighting arrangement according to a third embodiment from a side of the housing provided with a light outlet region.

In the third embodiment, as shown in FIG. 10, the element 6 in the body 6a has a rectangular, in particular square, cutout 228, which forms the light outlet region 31. A region 229 widening inwardly away from the outside 7 of the element 6 is formed in the shape of a truncated pyramid in the third embodiment of FIG. 10. Beyond this, however, the lighting arrangement 201 according to the third embodiment does not differ from the lighting arrangements 1 or 101 according to the first two embodiments. In the case of FIG. 10, one or more light-providing devices 36 may also be used.

Depending on the lighting requirement, a different number of light-providing devices 36 may be arranged within the interior 5. In the embodiments described here, by way of example, one, two, three or four light-providing devices 36 may be positioned in the interior 5, it being conceivable—optionally by changing the relative dimensions of the housing 3 and the light-providing devices 36—to accommodate an even larger number of light-providing devices 36 in the interior 5.

Figure 11:
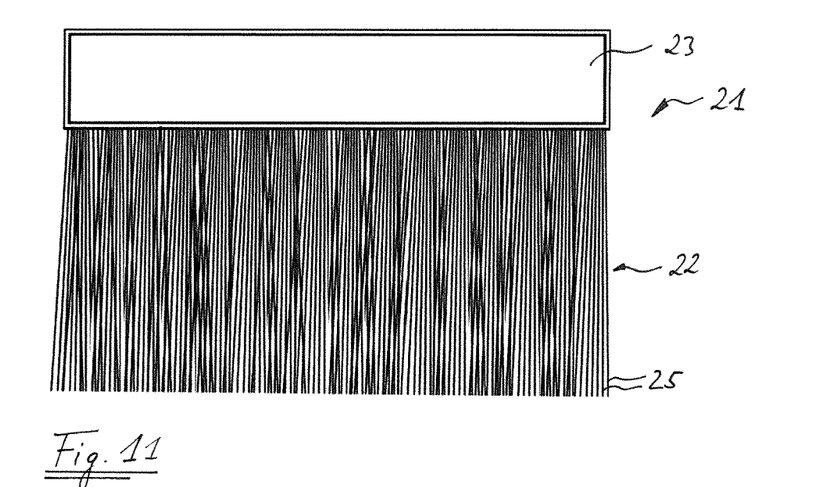
FIG. 11 schematically shows a cable brush in a front view.
Figure 12:
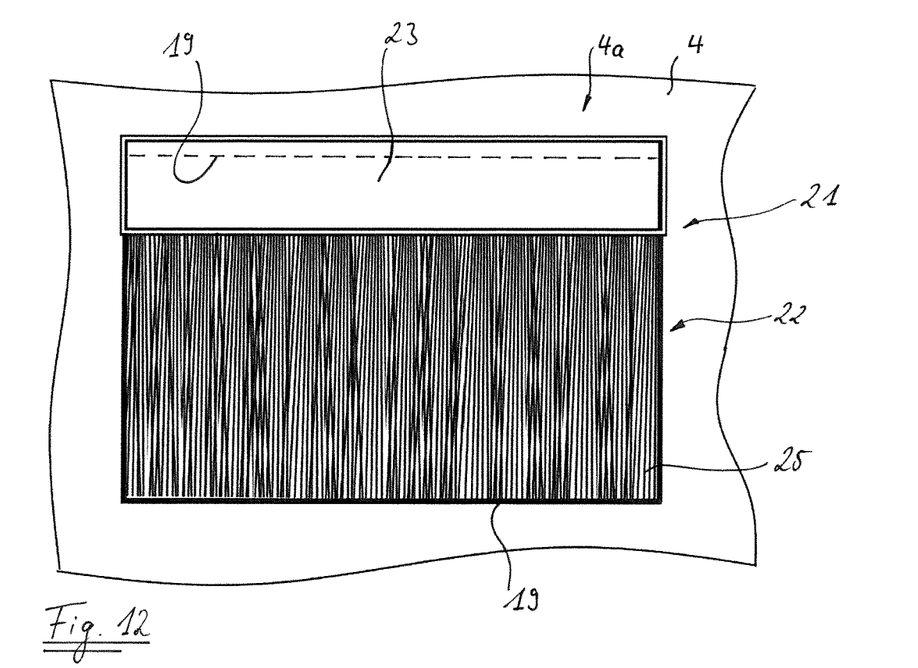
FIG. 12 schematically shows a cable brush arranged in an opening of a housing.

FIGS. 11 and 12 illustrate a cable brush 21, as can be used in the embodiments described here of the present invention. A base body 23 and an edging 22 with the hairs, fibres or bristles 25 are shown. FIG. 12 schematically shows how the cable brush 21 can cover the opening 19 by way of example.

Figure 13:
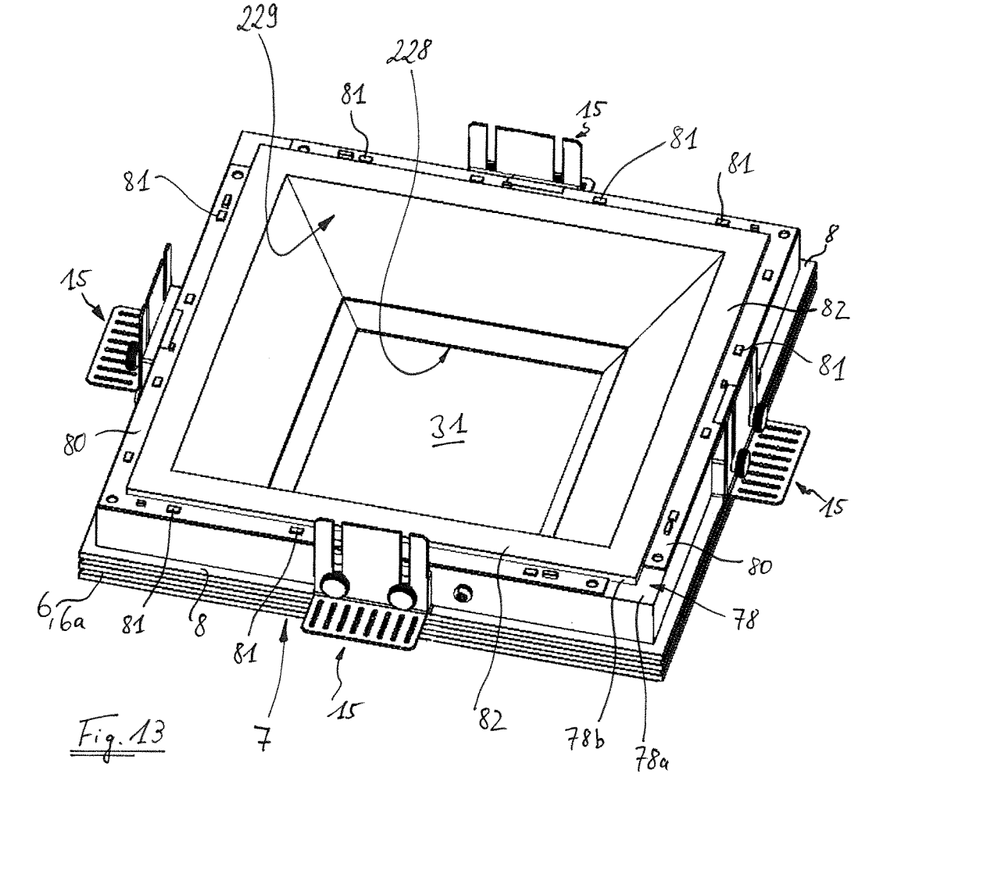
FIG. 13 is a perspective view of an element of the housing of the embodiment of FIG. 10 provided with a light outlet region, further components of the housing and additional light sources.

FIG. 13 shows the element 6 of the lighting arrangement 201 according to the third embodiment with the housing part 4 removed. In addition, the holding means 15 are shown. Except for the shape of the cutout 228 and the region 229, the elements 6 of the lighting arrangements 1 and 101 are also configured in accordance with FIG. 13. The element 6 has a shoulder 8 on the outside, on which, in the assembled state of the housing 3, an edge of the housing part 4 comes to rest in the region of the open end 4*f*. The edge of the housing part 4 in the region of the open end 4*f* is suitably formed in a corresponding manner. Furthermore, the body 6*a* of the element 6 is equipped with a peripheral recessed area 78, which forms a peripheral step in the peripheral direction around the entire element 6 and therefore surrounds the light outlet region 31 in the peripheral direction. The base face of the recessed area 78 is designated 78*a* and the side face facing outwardly is designated 78*b*. Both the shoulder 8 and the recessed area 78 are also provided in the embodiments of FIGS. 1 to 4. FIG. 3, 4 make it clear that the recessed area 78 in the assembled state of the housing 3 directly adjoins the wall regions 5*a* to 5*d* of the inner surface of the housing part 4, and therefore, in the region, in which the housing part 4 is coupled to the element 6, runs along the housing part 4.

FIG. 13 shows that two circuit boards 80 are arranged on the base face 78*a* in the region of the room formed by the recessed area 78, each of the circuit boards 80 substantially having the shape of an L with sides of equal length. Together, the circuit boards 80 in the example of FIG. 13 extend almost around the entire periphery of the element 6, and the recessed area 78 only emerges in the region of two corners. The circuit boards 80 are fastened on the element 6 in a suitable manner. Arranged on the circuit boards 80 are light-emitting diodes (LEDs) 81, of which only some are provided with a reference numeral in FIG. 13. In addition, conductor paths and further electronic components optionally required to operate the LEDs 81 are also arranged on the circuit boards. The circuit boards 80 can be connected to a suitable current source by means of connection lines, for example cables, not shown in FIG. 13.

The circuit boards 80 with the light-emitting diodes 81 therefore in each case form an additional light source. The light-emitting diodes 81, in the assembled state of the housing 3, face the interior 5, and owing to the arrangement of the circuit boards 80 in the recessed area 78, a body portion 82 of the element 6 is arranged between the light outlet region 31 and the respective additional light source 80. The additional light sources, which are formed by the circuit boards 80 with the LEDs 81, thus succeed in backlighting the interior 5 of the housing 3, and in producing the impression of a lighting (glowing) of the interior 5 itself through the light outlet region 31. The LEDs 81 are not directly visible from the outside owing to the body portion 82.

The circuit boards 80, as described above with respect to FIG. 13, may be used in all the embodiments of the invention, as presently described. The additional light sources with the light-emitting diodes 81 make it possible to produce the impression that the light-providing device 36, which can be directed pointwise onto an object located in a room, shines out of a hole, which is also lit.

Figure 14:
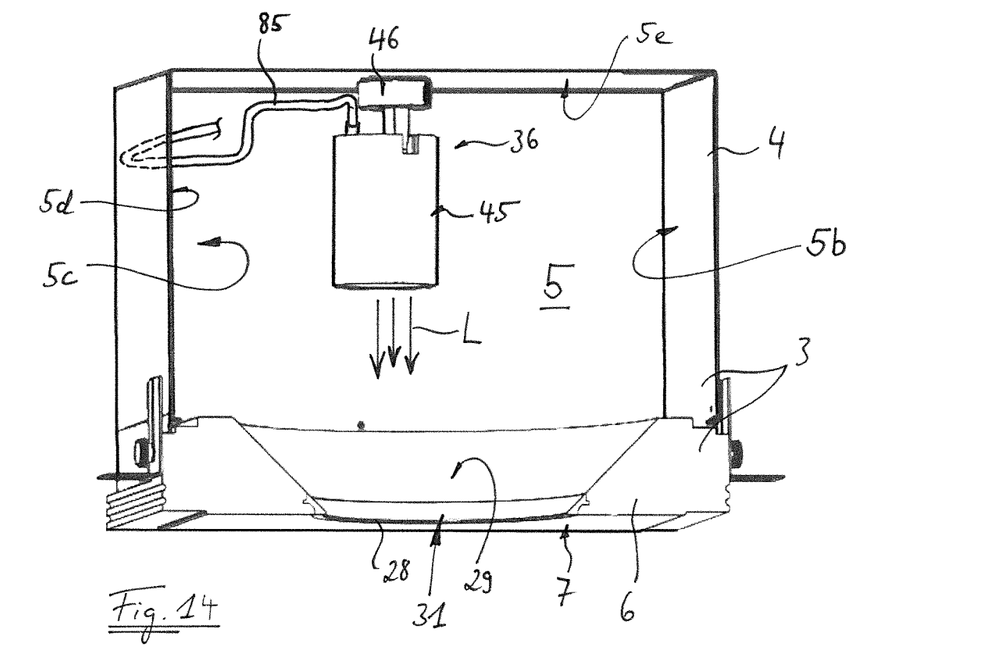
FIG. 14 is a perspective sectional view through a lighting arrangement according to a variant of the second embodiment, with a light-providing device and a supply cable magnetically coupled to the housing.
Figure 15:
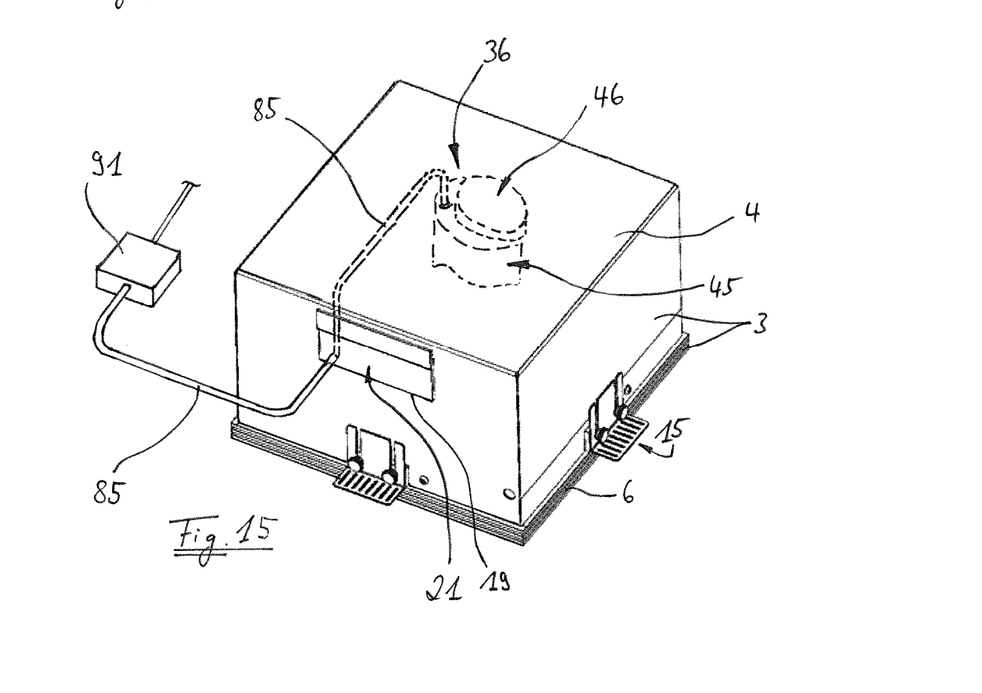
FIG. 15 is a perspective view of a lighting arrangement according to a further variant of the second embodiment from a side remote from a room to be lit, to schematically illustrate the electrical connection of the light-providing device.

To be able to supply each of the light-providing devices 36 with electrical current, provided for each of the light-providing devices 36 is a supply line 85, which is configured as an electrical cable. To allow connection to the mains, facilitated by additional devices such as, for example, a transformer 91 and switching and/or control devices, not shown in the figures and provided as required, each of the supply lines 85 is guided out of the interior 5 through the opening 19, which is covered by the cable brush 21. By way of example, this is shown in FIGS. 14 and 15 in two variants of the second embodiment, the supply line(s) 85 also being able to be arranged in an analogous manner in the other embodiments described here. While FIGS. 14 and 15 in each case only show one light-providing device 36, it is obvious that supply lines 85 can be arranged in a similar manner for further light-providing devices 36.

The supply line 85 is configured in such a way that it can be magnetically coupled to the housing 3, namely to the ferromagnetic housing part 4, so the line 85 is guided and held on the inside of the housing part 4, sagging of the supply line 85 is avoided, and it is thereby also prevented that the supply line 85 hangs in an undesired manner in the light beam or cone produced in each case by the light-providing devices 36.

FIG. 15 shows how, by way of example, the supply line 85 is magnetically guided along the inner surface region 5*e* until it can pass through the opening 19 between the hairs, bristles or fibres 25 of the cable brush 21 to the outside. The supply line 85 is connected in FIG. 15 to the transformer 91, which in turn is electrically connected to the mains with the interposition of, for example, a switching device (not shown).

Figure 16:
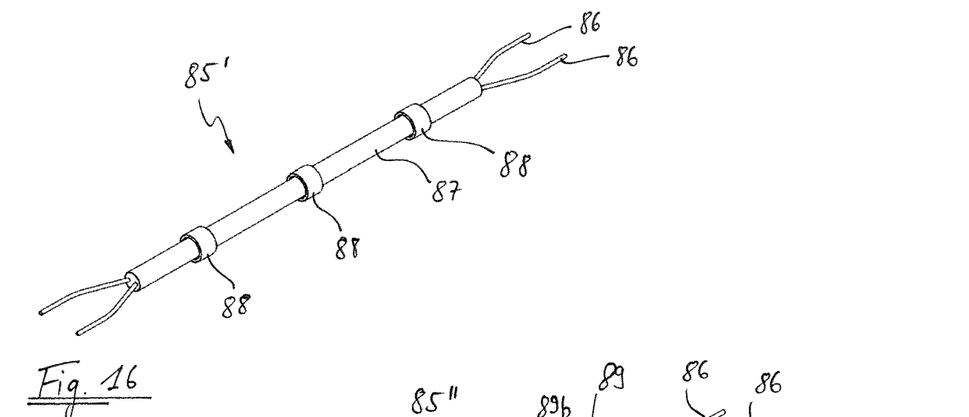
FIG. 16 shows a line configured as a cable that can be magnetically coupled to a housing component.
Figure 17:
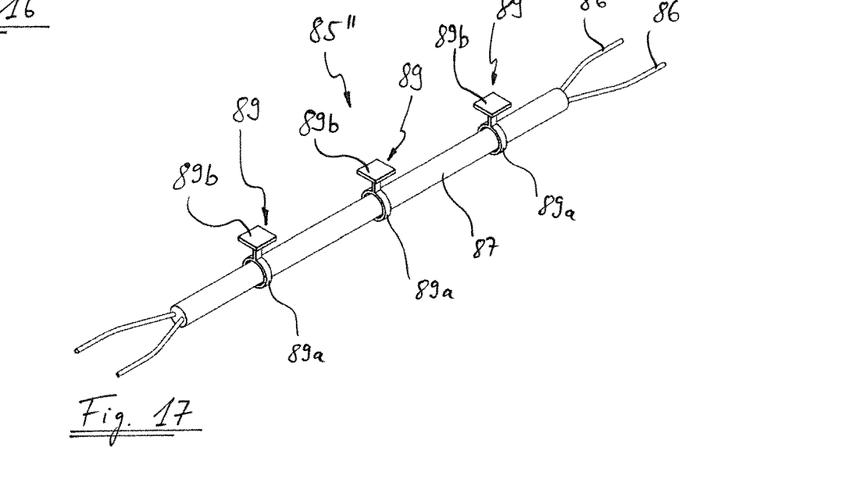
FIG. 17 shows a line configured as a cable that can be magnetically coupled to a housing component according to a variant.
Figure 18:
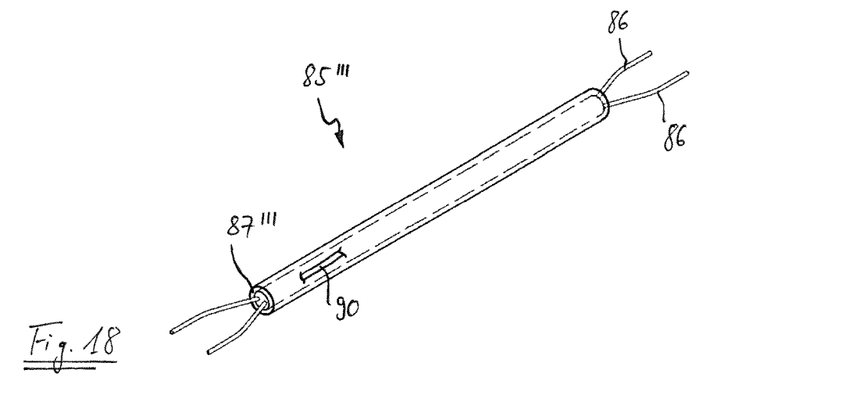
FIG. 18 shows a line configured as a cable that can be magnetically coupled to a housing component according to another variant.

FIGS. 16, 17 and 18 show different variants as to how the magnetic coupling of the supply line 85 to the housing part 4 can take place with the aid of exemplary portions of lines 85', 85", 85'". The supply line 85' in FIG. 16 has conductors 86, a sheath 87 as well as annular holding elements 88 surrounding the sheath 87 on the outside thereof and fastened to the sheath 87, said holding elements in turn being magnetic or in which a respective permanent magnet is embedded. In the case of the supply line 85" of FIG. 17, instead of the annular holding elements, clips 89 are configured with an annular holding portion 89*s* and a magnetic adhering portion 89*b*. The adhering portion 89*b* may be a permanent magnet or a permanent magnet may be embedded in the adhering portion 89*b*. In the variant of FIG. 18, the supply line 85'" is provided with a sheath 87'", magnetic components, in the form of small individual magnets, magnetised strips or magnetic woven fabrics being able to be embedded in the sheath 87'". Only one portion of a magnetised strip 90 is shown by way of example in FIG. 18.

The construction of a lighting arrangement 1, 101, 201 according to one of the embodiments described above preferably takes place in the manner described below.

Firstly, the housing 3 having the housing part 4, the element 6, the cable brush 21 arranged in the opening 19 and the holding means 15 is provided. The circuit boards 80 are already fastened to the element 6 and a cable for the energy supply thereof can be guided by way of example from the interior 5 through a suitable opening in the housing part 4. Furthermore, one or more light-providing device(s) 36 are provided.

The housing 3 is fastened with the aid of the holding means 15 in the recess 10*a* in the suspended plaster ceiling 10, and the element 6 is sealed in a suitable manner. It is preferably ensured here that a connection or network cable has already been pulled out of the region of the room above the suspended ceiling 10 through the opening 19 and is hanging in the interior 5.

At the end thereof there may, for example, be provided a suitable plug or clamping connection. When the installation of the housing 3 in the ceiling 10 is completed, in a subsequent step, the desired number of light-providing devices 36 may be introduced consecutively in the interior 5 through the cutout 28 or 228 and in each case coupled to the housing 3, as described above. The magnetic coupling by means of the permanent magnets 55 allows the introduced light-providing devices 36 to be freely positioned in the interior 5 and displaced and rotated in a sliding manner back and forth on the housing 3 until the desired lighting effect can be achieved by light emission through the light outlet region 31 to the outside. The pivoting about the pivot axis 48 allows further flexibility. For operation, the light-providing devices 36 are held by means of magnetic force within the interior 5. The insertion of the light-providing devices 36 and their arrangement in the interior 5 and the coupling and adjustment may take place through the cutout 28, 228. The transformer 91 is connected to the connection cable that is hanging out, the supply lines 85 of the light-providing devices 36 are connected to the transformer 91 and the remainder of the connection cable together with the transformer 91 and the unrequired length of supply line 85 can thereupon be inserted through the opening 19 into the region between the suspended ceiling 10 and the bare ceiling. The opening 19 and the cable brush 21 are dimensioned in such a way that it is possible without problems to push the transformer 91 through. The required length of the respective supply line 85 then remaining in the interior 5 is cleanly arranged and guided by magnetic adhesion of the lines 85 on the housing part 4 within the interior 5, without sagging or disturbing.

It is noted that in all the embodiments described above, each of the light-providing devices 36 can be configured according to FIGS. 5 to 8 and preferably contains one or more LEDs as light sources. However, it is conceivable for the light-providing devices 36 to produce light in another manner, it being possible to use any desired lighting means. Instead of LEDs, for example, filament lamps and/or halogen lamps and/or other suitable lighting means or light sources could be provided.

Although the present invention was completely described above with the aid of exemplary embodiments, it is not limited thereto, but can be modified in diverse ways.

For example, the shape of the element 6 and the shape of the base face of the housing part 4 are not necessarily square in each case. The element 6 could, for example, instead be formed in an elongate manner, for example in the manner of an elongate rectangle, circularly or in the manner of an ellipse. The housing part 4 could also be configured as a rather elongate cube, or the housing 4 could be configured in one variant with, for example, curved wall faces, for example to be cylindrical, for example, but not necessarily, corresponding to the shape of the element 6. In one case, in which the housing part 4 has curved wall portions, for easy coupling of the light-providing devices to the housing, preferably at least one flat inner surface region 5e can be provided on the top of the housing part 4.

In addition, the invention is not limited to elements 6 having a single cutout, and therefore also not to a single light outlet region. Specifically, in the case of rather elongate elements 6, if desired, these could also be provided with two or more cutouts, which then in each case form a light outlet region.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A lighting arrangement comprising
a housing having an interior and a light outlet region, and comprising at least one light-providing device, wherein the light-providing device is configured to be arranged within the interior to emit light during operation through the light outlet region to the outside;
wherein the light-providing device is configured to be coupled to the housing and is freely positionable at least within a region of the interior, and
wherein the light-providing device has a soft component which comes into contact with the housing when the light-providing device is coupled to the housing.

2. The lighting arrangement of claim 1, wherein to fasten the light-providing device on the housing at various locations within the interior, the light-providing device is configured to be coupled by magnetic force to a component of the housing.

3. The lighting arrangement of claim 1, wherein the light-providing device, for coupling to the housing, is configured to be fastened to magnetically adhere to at least one inner surface region of the housing.

4. The lighting arrangement of claim 1, wherein the light-providing device has at least one magnet to couple the light-providing device to the housing.

5. The lighting arrangement of claim 1, wherein the housing is configured as an installation housing and is set up in such a way that the housing is insertable in a recess provided for this in a ceiling and is configured for being fastened in the recess.

6. The lighting arrangement of claim 1, wherein the housing has a housing part with top and wall portions and with one open end and wherein the housing furthermore has an element coupled to the housing part in the region of the open end of the housing part, wherein the element is provided with the light outlet region and wherein the light outlet region is smaller than the open end of the housing part.

7. The lighting arrangement of claim 6, wherein the light-providing device is configured to be coupled to the housing part by magnetic force.

8. The lighting arrangement of claim 6, wherein the element has an opaque body, the opaque body being provided with a cutout, which forms or contains the light outlet region.

9. The lighting arrangement of claim 1, wherein the lighting arrangement has a plurality of light-providing devices, wherein each of the light-providing devices is freely positionable at least within one region of the interior.

10. The lighting arrangement of claim 1, wherein the soft component is configured as a felt element.

11. The lighting arrangement of claim 1, wherein in addition to the free positionability of the light-providing device, the light-providing device is configured to be oriented or adjusted to change a beam direction of the light-providing device as required.

12. The lighting arrangement of claim 1, wherein the lighting arrangement has at least one additional light source, which is arranged and configured to emit light into the interior and to thereby backlight the housing.

13. The lighting arrangement of claim 1, wherein the housing is equipped with an opening, which is set up to guide at least one supply line serving to supply the light-providing device with electrical current out of the interior, and wherein the lighting arrangement has a brush, wherein the hairs or fibres or bristles of the brush are arranged in the opening or cover the opening or at least portions of the opening.

14. The lighting arrangement of claim 1, wherein the lighting arrangement has a supply line provided to supply the light-providing device with electrical current, the line being configured to be magnetically coupled to a component of the housing and to thereby be held or guided within the interior.

15. A method for constructing a lighting arrangement, having the steps:
providing a housing having an interior and a light outlet region, and providing at least one light-providing device having a soft component;
introducing the light-providing device into the interior and coupling the light-providing device to the housing in order to hold the light-providing device within the interior, wherein the soft component comes into contact with the housing when the light-providing device is coupled to the housing; and
positioning the light-providing device in such a way that the light-providing device, as required after additionally orienting it, emits light through the light outlet region to the outside during operation.

16. The method of claim 15, wherein the light-providing device is coupled to a component of the housing by magnetic force.

17. The method of claim 15, wherein the method furthermore comprises an adjustment of the light-providing device by sliding displacement or rotation of the light-providing device on the housing.

18. The method of claim 15, wherein the introduction of the light-providing device into the interior, the coupling thereof to the housing and the positioning of the light-providing device take place through a cutout, which forms or contains the light outlet region.

19. The method of claim 15, wherein the method furthermore comprises arranging a supply line provided to supply the light-providing device with electrical current within the interior and magnetically coupling the line to a component of the housing to hold the line within the housing.

20. The lighting arrangement of claim 4, wherein the at least one magnet is a permanent magnet.

21. The method of claim 15, wherein the introduction of the light-providing device into the interior, the coupling thereof to the housing and the positioning of the light-providing device take place through a cutout, which forms or contains the light outlet region, once the housing is mounted in the region of a ceiling.

22. A lighting arrangement comprising:
a housing having an interior and a light outlet region, and at least one light-providing device,
wherein the light-providing device is configured for being arranged within the interior to emit light during operation through the light outlet region to the outside,
wherein the light-providing device is positionable at least within one region of the interior and is configured to be coupled to the housing by at least one magnet, and
wherein the light-providing device has a soft component which comes into contact with the housing when the light-providing device is coupled to the housing.

* * * * *